US007100121B2

(12) United States Patent
Rosenkranz et al.

(10) Patent No.: US 7,100,121 B2
(45) Date of Patent: Aug. 29, 2006

(54) FRANKING SYSTEM USER INTERFACE (75) Inventors: Daniel Rosenkranz, Uetendorf (CH);
Christian Moy, Grossaffoltern (CH);
Thomas Maniura, Solothurn (CH);
Stefan Zehner, Bern (CH); Jaime DaSilva, Naugatuck, CT (US); Drew Casey, Akron, OH (US)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 501 days.

(21) Appl. No.: 10/081,578

(22) Filed: Feb. 22, 2002

(65) Prior Publication Data
US 2002/0126148 A1   Sep. 12, 2002

Related U.S. Application Data (60) Provisional application No. 60/338,892, filed on Nov. 5, 2001, provisional application No. 60/277,946, filed on Mar. 22, 2001, provisional application No. 60/277,931, filed on Mar. 22, 2001, provisional application No. 60/277,873, filed on Mar. 22, 2001, provisional application No. 60/277,841, filed on Mar. 22, 2001, provisional application No. 60/277,806, filed on Mar. 22, 2001, provisional application No. 60/270,796, filed on Feb. 23, 2001.

(51) Int. Cl.
*G06F 3/00* (2006.01)

(52) U.S. Cl. .................. 715/787; 715/705; 715/738; 715/973; 715/790

(58) Field of Classification Search ................ 715/179, 715/705, 708, 738, 787, 790, 802, 851, 973; 235/379
See application file for complete search history.

(56) References Cited

U.S. PATENT DOCUMENTS

| 5,402,152 | A | * | 3/1995 | Needham | 345/179 |
| 5,717,596 | A | * | 2/1998 | Bernard et al. | 705/404 |
| 5,818,020 | A | * | 10/1998 | Kabacaoglu et al. | 235/379 |
| 6,016,484 | A | | 1/2000 | Williams et al. | 705/39 |
| 6,208,338 | B1 | * | 3/2001 | Fischer et al. | 715/705 |
| 6,266,055 | B1 | * | 7/2001 | Mozdzer et al. | 715/866 |
| 6,424,954 | B1 | | 7/2002 | Leon | 705/401 |
| 6,466,935 | B1 | * | 10/2002 | Stuart | 707/10 |
| 6,732,152 | B1 | * | 5/2004 | Lockhart et al. | 709/206 |

* cited by examiner

*Primary Examiner*—Weilun Lo
*Assistant Examiner*—Mylinh Tran (57) ABSTRACT

A franking machine control panel and its associated method provide users with touch screen displays in which the main screens contain history tabs. When a history tab is pressed, the display reverts to the previous status of the category of interest, and allows the user to make changes if desired. In the preferred embodiment, the history tabs allow users to view and modify information which is mandatory to the franking process, such as the mail class and postage rates. Another aspect of the present invention allows the user to configure the more actively used buttons of touch screen on one side or the other, depending on the dominant side of the user's body.

30 Claims, 10 Drawing Sheets

FRANKING SYSTEM USER INTERFACE

CROSS-REFERENCE TO RELATED APPLICATIONS

This application claims priority of the following U.S. provisional patent applications:
Ser. No. 60/270,796 filed on Feb. 23, 2001,
Ser. No. 60/277,806 filed on Mar. 22, 2001,
Ser. No. 60/277,841 filed on Mar. 22, 2001,
Ser. No. 60/277,873, filed on Mar. 22, 2001,
Ser. No. 60/277,931 filed on Mar. 22, 2001,
Ser. No. 60/277,946 filed on Mar. 22, 2001, and
Ser. No. 60/338,892 filed Nov. 5, 2001.

BACKGROUND OF THE INVENTION

1. Field of the Invention

The present invention generally relates to high-volume, franking machines that allow users to conveniently and automatically cause the correct postage indicia to be placed on a large number of mail pieces. More particularly, the present invention relates to the control panels of franking machines for monitoring the operation of the machines, and for entering commands and data.

2. Brief Description of Related Developments

High-speed digital franking machines, such as those marketed by Ascom Autelca AG, the assignee of the present Letters Patent, are apparatuses that allow a postal customer to both rapidly determine the correct postage for a high volume of mail items, and to affix a postage indicia on the mail item in an automated or semi-automated manner. Determining the correct postage can involve such steps as weighing the mail, sizing the mail, and determining the mail destination. The general components often include: an initial feeder for individually feeding pieces of mail into the machine, a weighing machine for weighing each piece of mail; a user interface for monitoring and controlling the operation of the machine and for entering data as needed, a postage calculator for calculating the correct postage for each piece of mail; a postage affixer for affixing indicia representing the correct postage on each piece of mail; and a machine discharger for discharging the mail from the machine. The postage may be printed on a sticker and then affixed to the flat (e.g., envelope, postcard, etc.) or parcel, or it may be printed directly onto the mail.

An increased demand for franking machines is partly due to the willingness of various postal authorities to allow private parties to generate their own postage indicia, provided there are secure methods for payment, authentication, fraud prevention and the like. Such a system includes the United States Postal Service's Information-Based Indicia Program (IBIP).

Essential to the operation of a self-contained franking machine, is the control panel. The control panel allows the user to both monitor the operation of the franking machine, as well as enter critical data and commands or directives. Various displays have been used or proposed, including, inter alia, flat panel displays, CRTs, and touch screen displays. The display can be a series of separate displays activated automatically, or by the user.

Regardless of the display technology used, what is always desirable, and has never quite been sufficient in the prior art, is a more user-friendly control panel and its associated displays. One particular problem with prior art franking machine display approaches is that there is no user-friendly way of determining the previous actions (data or commands) with regard to a currently-displayed category of information or commands of interest. Especially as relates to mandatory information needed for the franking process (e.g., mail class and other information), there is a need to conveniently reach the previous status of such information and to effect change when desired.

SUMMARY OF THE INVENTION

In view of the above-identified deficiencies of the prior art, the present invention provides a control system for a franking machine. The control system at least includes a system controller, and a control interface for manually entering data and system directives. The control interface at least includes a touch screen display, and a display generator adapted to generate display screens having a plurality of touch button regions. The control system is adapted to generate main screens and work screens, these screens also at least including main areas for entering current data and directives, and history tabs adapted to activate displays for viewing the status and previous action associated with a category of functions or information, and allowing a user to change information in the category associated with each specific history tab.

The present invention also provides, in a franking system, a control interface for manually entering data and system directives. The control interface at least includes a touch screen display, a display generator adapted to generate display screens having a plurality of touch button regions, and a user display preference control coupled to the display generator, and adapted to control the grouping and orientation of the touch button regions.

The present invention additionally provides a method of controlling the operation of a franking machine. The method at least includes the steps of providing system control via a system controller, providing a control interface, via the control interface, manually entering data and system directives, generating via the control interface, a touch screen display, and via a display generator, generating display screens having a plurality of touch button regions. The display screens at least include main screens and work screens, these screens also comprising main areas for entering current data and directives, and history tabs adapted to activate displays for viewing the status and previous action associated with a category of functions or information, and allowing a user to change information in the category associated with each specific history tab.

The present invention further provides, in a franking system, a control interfacing method for manually entering data and system directives. The control interface method at least includes the steps of providing a touch screen display, via a display generator, generating display screens having a plurality of touch button regions, and via a user display preference control coupled to the display generator, controlling the grouping and orientation of the touch button regions.

The present invention is described in detail below, with reference to the drawings.

BRIEF DESCRIPTION OF THE DRAWINGS

The foregoing aspects and other Features of the present invention are explained in the following description, taken in connection with the accompanying drawings, wherein.

DETAILED DESCRIPTION OF THE PREFERRED EMBODIMENTS

Figure 1:
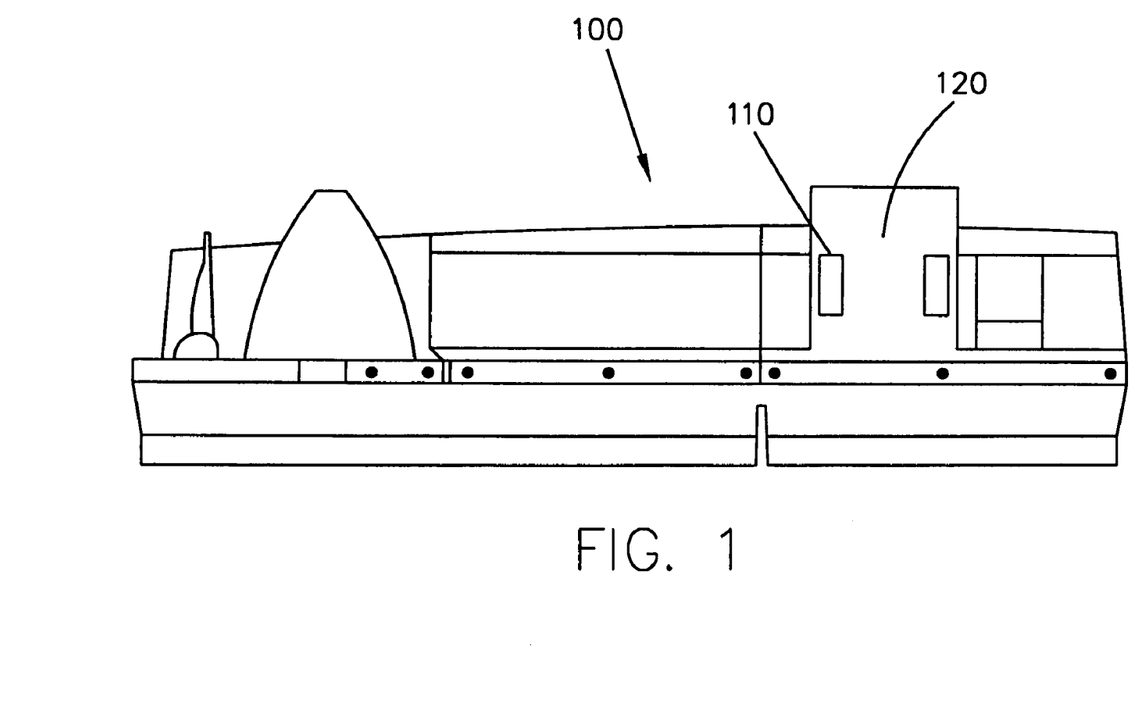
FIG. 1 is a front view of a franking machine having the present-inventive control panel.

FIG. 1 is a front view of a franking machine 100 embodying the present invention. Along with its many components, the franking machine 100 also contains a control panel 110 having a flat panel display screen 120. The remainder of this Letters Patent will be directed to the control panel operation, as the other components of the franking machine are immaterial for an understanding of the control panel by one skilled in the art to which the present invention pertains.

Figure 2:
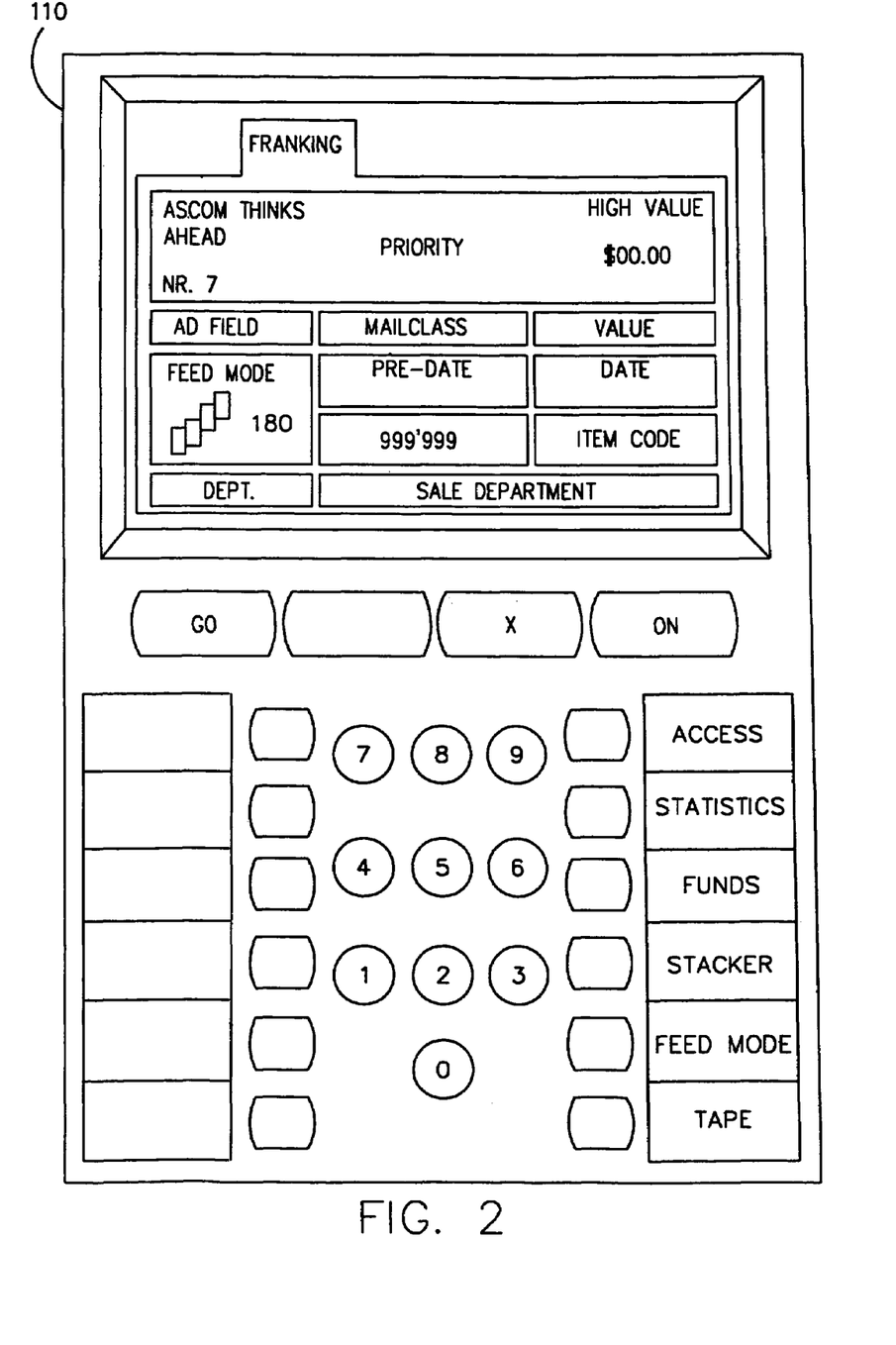
FIG. 2 is a more detailed view of the present-inventive control panel.

A more detailed view of the control panel 110 is shown in FIG. 2. In the preferred embodiment, the control panel contains a number of physical keys (which displace when touched) toward the bottom. Besides the set of numerical keys, a set of user programmable keys (on the left) and a set of fix labeled keys (on the right) are provided. The concept of fix labeled keys is described in pending U.S. application Ser. No. 09/938,298 filed Aug. 22, 2001 which is a Continuation-In-Part of U.S. application Ser. No. 09/152,959 filed Sep. 14, 1998, now U.S. Pat. No. 6,295,523, which is based on U.S. Provisional Application Ser. No. 60/059,099 filed Sep. 16, 1997. Below the touch screen is a row of command keys and a green LED, which is an optical feedback to the user. Among these keys is a "fox" key. Pressing this key will activate an additional layer of screens (the "fox" screens).

A touch screen 120 appears toward the top of the control panel. The touch screen produces a series of displays related to the franking of mail. The screens are broadly categorized as main screens, work screens and overlay screens.

Figure 3:
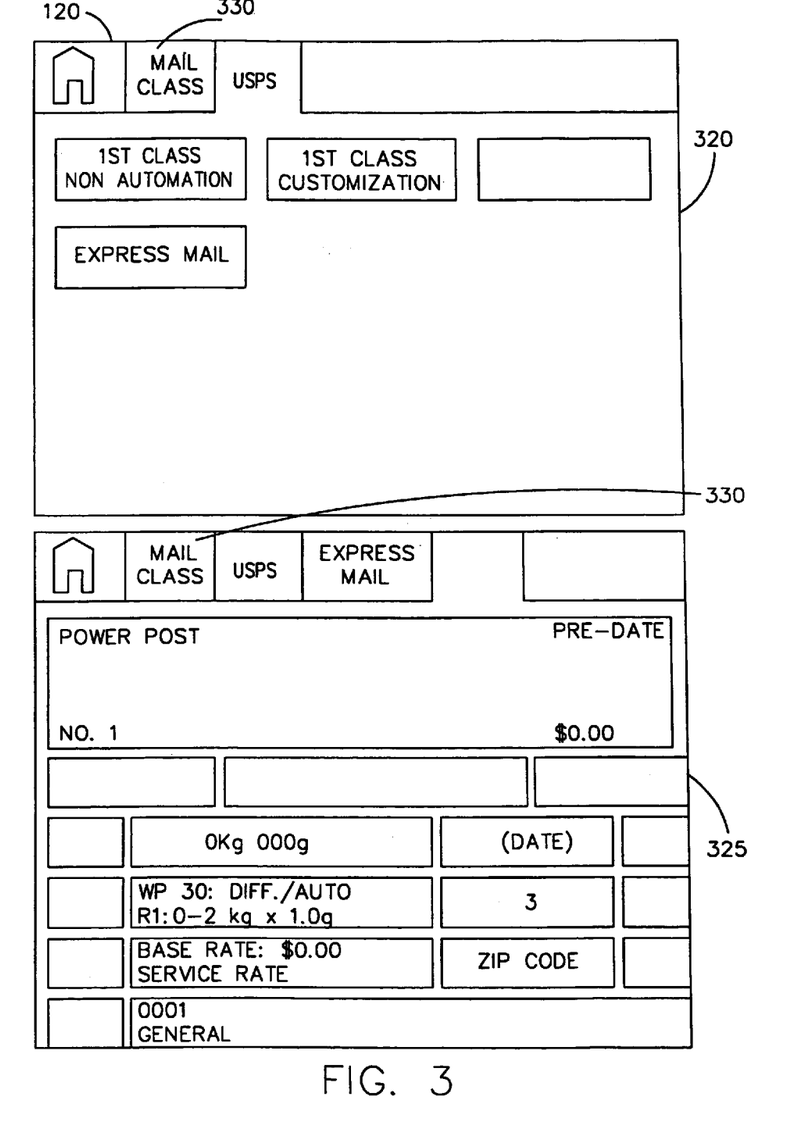
FIG. 3 is an example of a main screen and a work screen with the present-inventive history tabs.

The main screen 320 and the work screen 325 in FIG. 3 illustrate a novel aspect of the present invention. That is, the main screens contain a tool bar 330 containing history tabs 332.

Figure 4A:
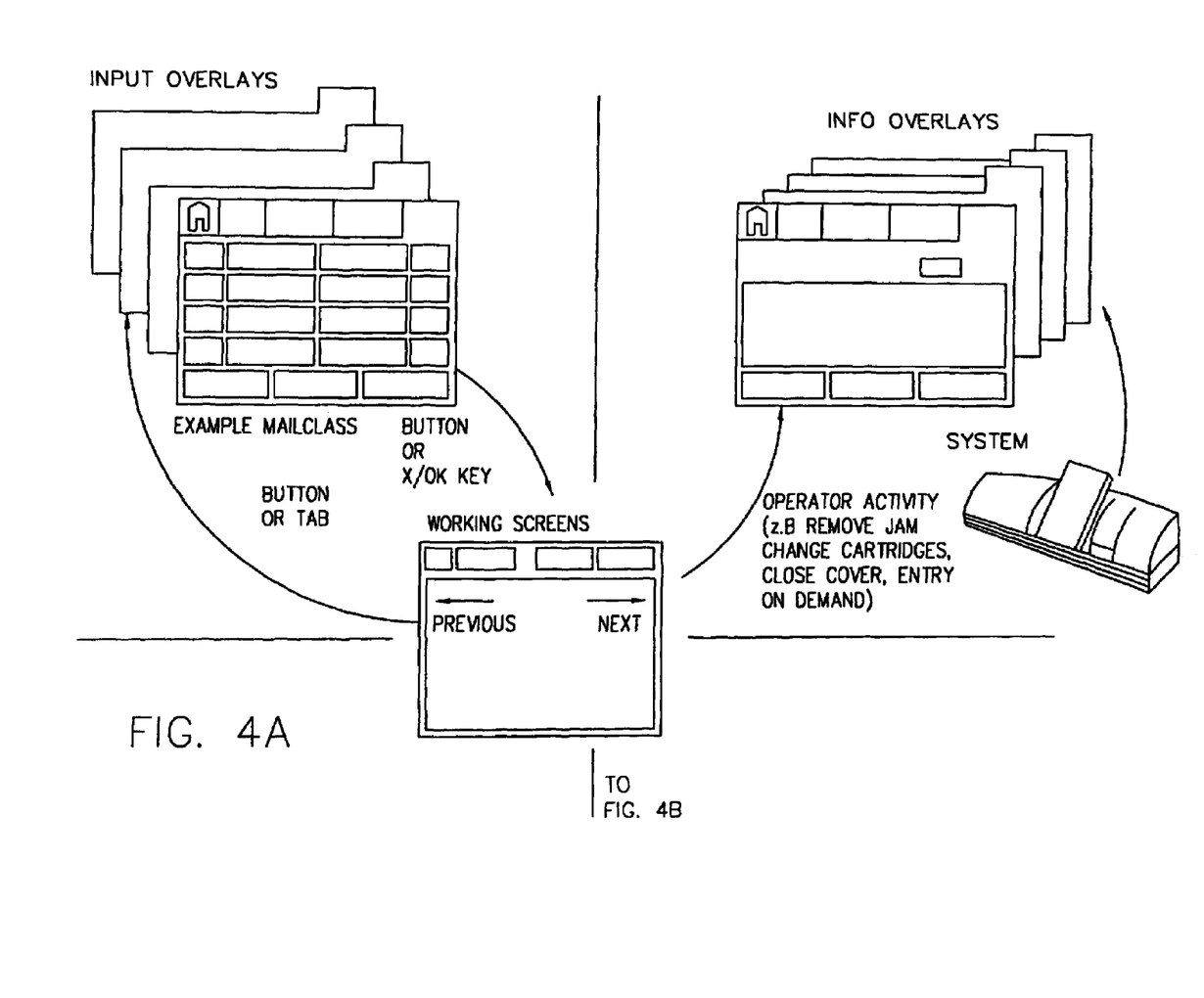
FIG. 4 is an example of the relationship between work screens having history tabs of the present invention and overlay screens having a flag (upper right)
Figure 4B:
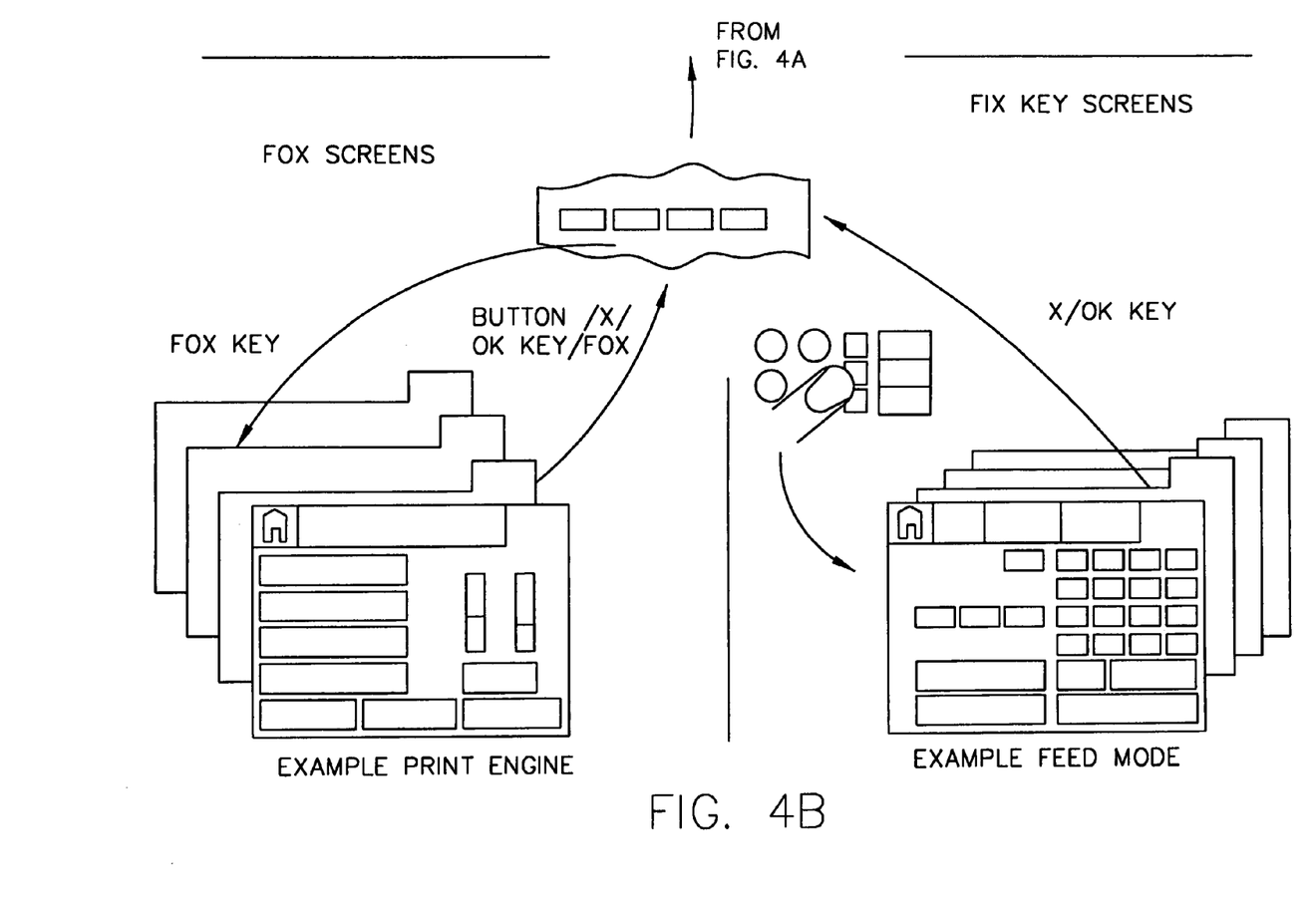

History tabs are labeled areas on the touch screen that return the display to a previous screen associated with the label. For example, one of the history tabs in a main display might be labeled "mail class." Pressing this history tab allows the user to return to the mail class selection/designation screen, allowing the user to view information about the mail class of mail to be franked, and make a change or changes if desired. FIG. 4 illustrates how when a history tab is activated, a working screen can be used to help scroll through and enter information.

Figure 5:
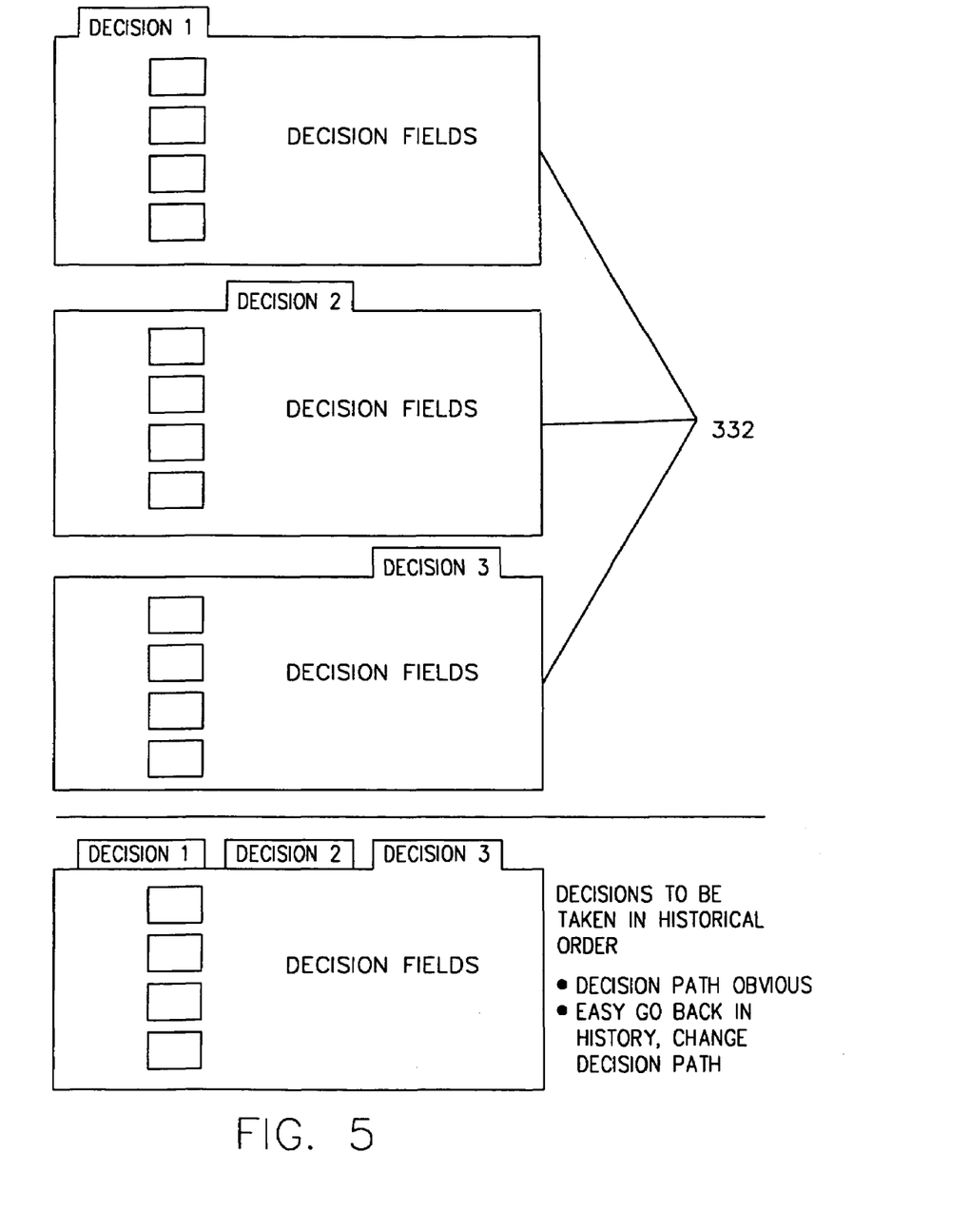
FIG. 5 is a more detailed view of example history tabs.
Figure 6:
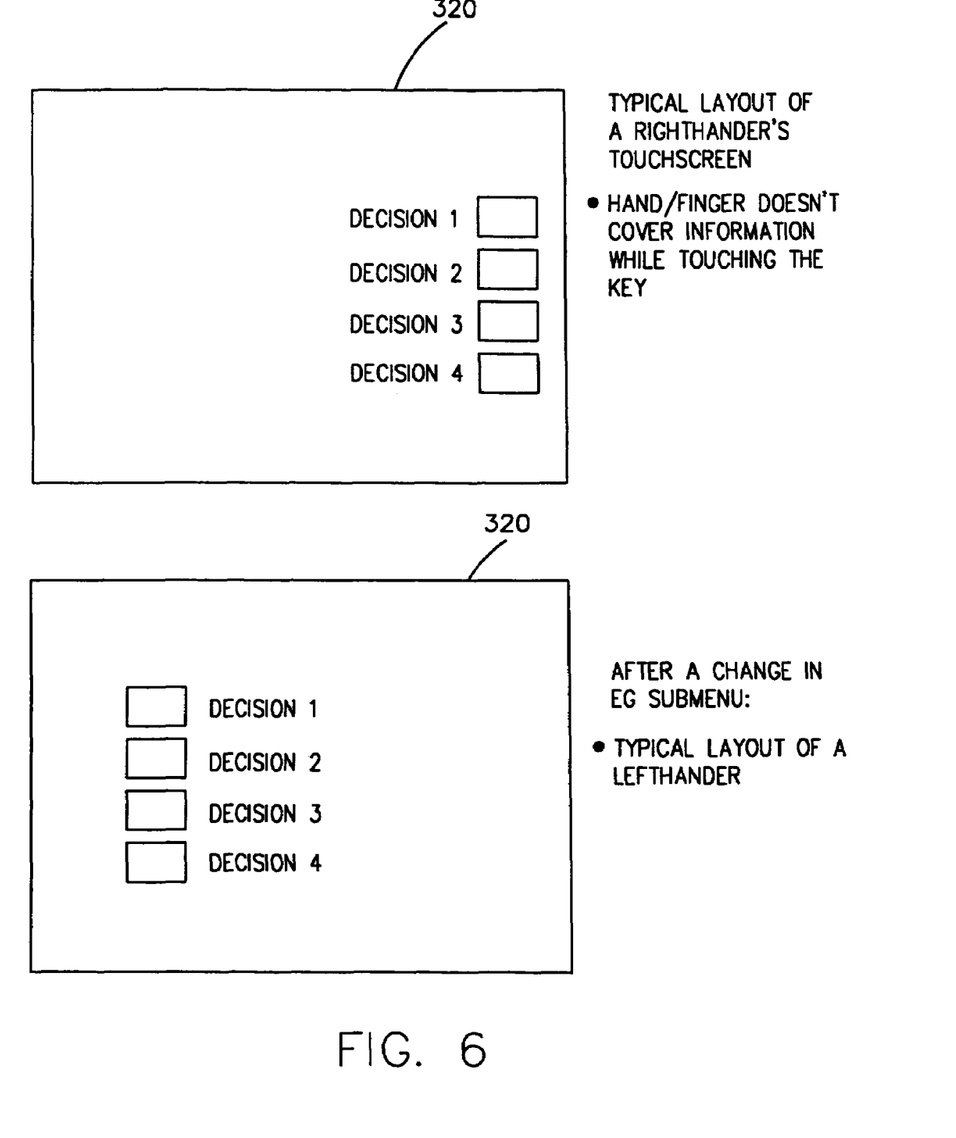
FIG. 6 is an example of the present-inventive feature allowing a user to place touch screen buttons on a preferred side of a display.

FIG. 5 shows enlarged views of activated history tabs 332, also labeled as "decision fields." From FIG. 5, it can be seen that the activated history tabs have a column of buttons related to the category that the user can activate to make data entries and enter commands. When located on one hemisphere of a display, the buttons are more easily controlled by a user whose body-side dominance (i.e., right-handedness or left-handedness) matches that of the display. Because of this, the present invention novelly allows the user to configure the screens so that columns of buttons expected to be more frequently touched can be placed on the side of the screen favoring his/her body-side dominance. FIG. 6 shows, at its top, an example of screen buttons located for ease of operation by a right-handed user. In contrast, the bottom display is an example of a screen configured for ease of operation by a left-handed user.

Figure 7:
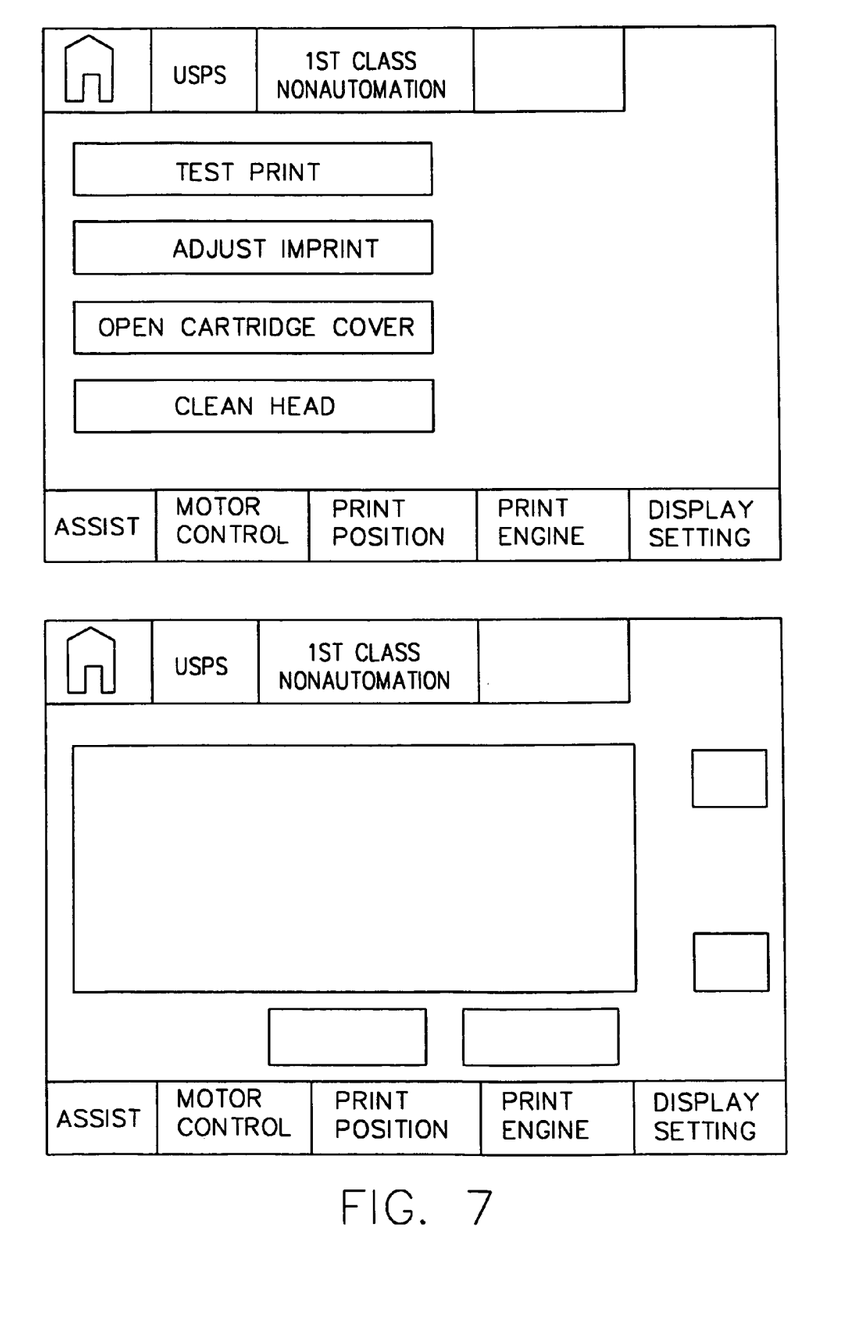
FIG. 7 shows two examples of a fox overlay screen having a fox flag (upper right) and a row of tabs at the bottom.

FIG. 7 shows two examples of fox screens. It is a fixed set of overlay screens adaptive to the main- or work-screen open when pressing the fox key. The advantage is that an additional set of displays often used is accessible using very few keystrokes, without leaving the present work screen. Typical use of these fox screens include display setting, print engine management, print position settings, motor control settings and providing an assistant screen giving context sensitive information to the user. These screens are reached by pressing the fox key and then one of the tabs in the row at the bottom of the screen. The available set of screens is always visible on the tabs and the screen selected via the tab is popped on top of the set. The selected screen, even when leaving the fox screen and returning later, remains until another tab is pressed. Return to the work level screen is by way of pressing "OK" (confirm a new entry) or "X" (return to previous screen).

Figure 8:
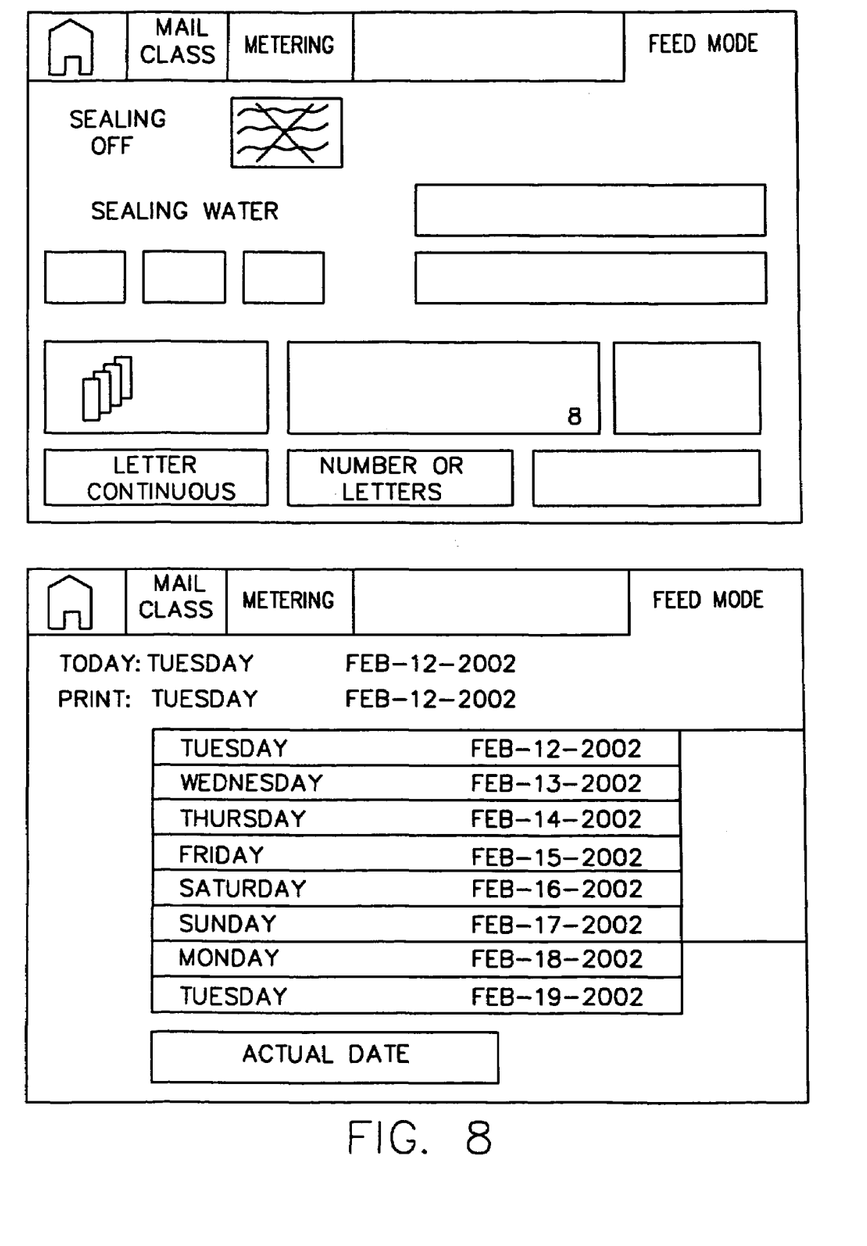
FIG. 8 shows two examples of input overlay screens having a flag (upper right)

FIG. 8 shows two examples of common overlay screens activated either by a fix labeled key or a button on the work screen for inputting data or selections.

All overlay screens carry a flag on the upper right with their name. The tool bar 330 with the history tabs 332 is partly covered by this flag and is not active accessible as long as an overlay screen is open., but is there to inform the user about where he is in the work screen level.

Figure 9:
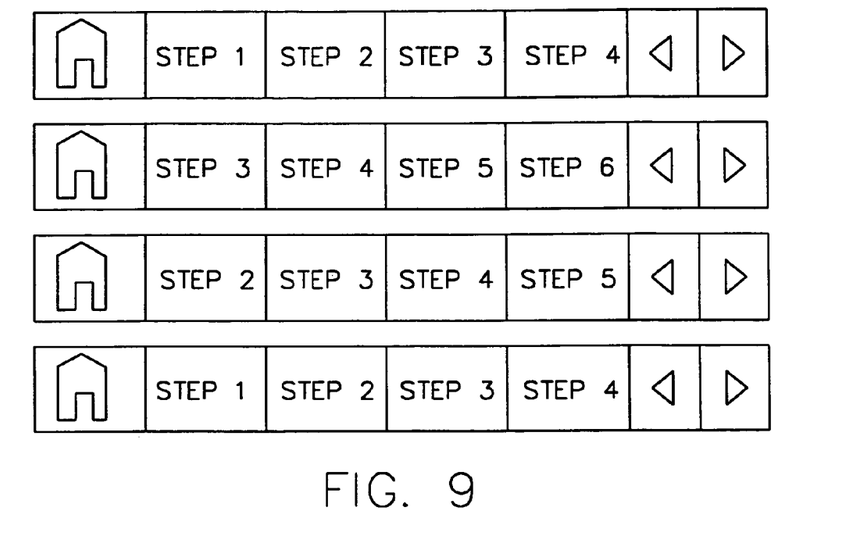
FIG. 9 shows examples of tool bar screens.

FIG. 9 illustrates how the tool bar 330 is handled when the history tabs are too long for displaying. The active tab is always lit and visible (except for the third line, which shows the situation while navigating through the toolbar), and navigation buttons show when there are more tabs on the left or the right.

Figure 10:
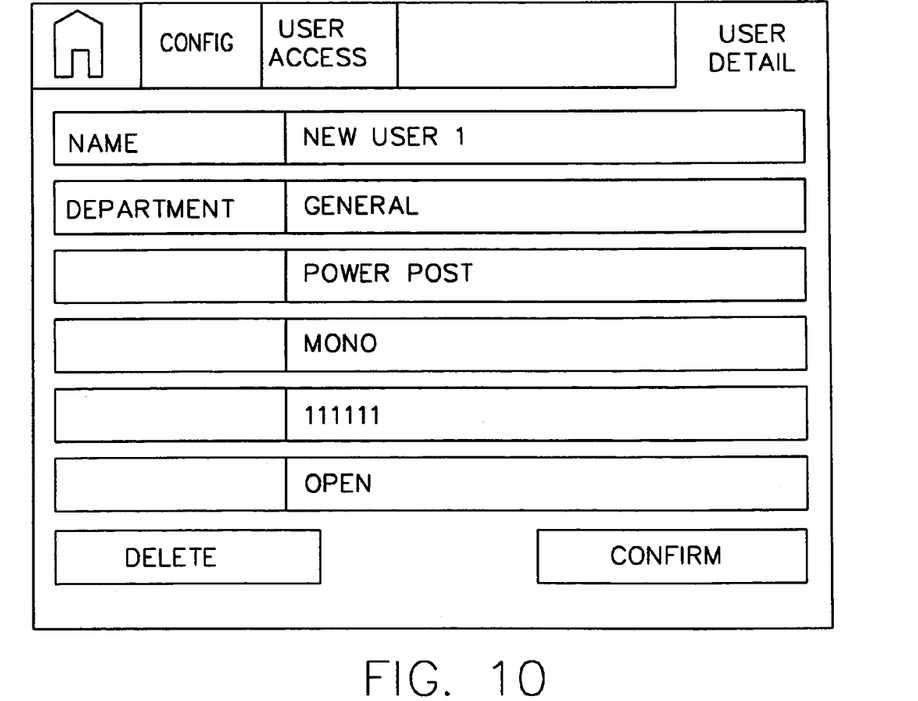
FIG. 10 shows an example of a user profile definition screen.

FIG. 10 shows a user profile definition screen that explains how the assignment of a specific ad field to a specific user is solved Franking Systems of the type disclosed herein can include an addressing module. The addressing module is generally an optional part of the system. It retrieves addresses out of a database and prints them onto envelopes. The printer in the system prints indicia onto the envelope. The indicia is the entire printing field that is printed onto the envelope and contain such information as postage value, city, date, ad fields, etc. Ad fields, or ad dies, are areas within the general postage printing where advertising data, pictures, text, etc. may be printed.

In one embodiment of the system, the touchpad screen can be modified to display an alphanumeric keyboard to the operator for the entering of addresses. The main menu on the screen can include an icon that, when actuated by the operator, displays on the touchpad screen an address input; for example, a screen having input fields for addresses, such as return addresses, mailing addresses, etc. Once the input screen is displayed, the operator can input an address which is to be printed on envelopes through the addressing module.

Addresses can be inputted and supported without requiring an additional PC or external device to download information.

Ad fields, that is an advertisement slogan placed on the letter together with the postal indicia, can be printed on mailing envelopes. In a further embodiment of the system, specific ad fields are linked to separate departments or accounts, or the individual users. Software can be provided that contains all the variations of ad fields that can be printed. When new accounts or user profiles are created, or existing accounts or user profiles are to be edited, on the mailing system, such as through the alphanumeric keyboard on the touchpad screen, the operator can be prompted by the software to select which ad field is related to which account or user profiles. From that point on, the account or user profile will always use the selected ad field when printing takes place. A similar function is enabling the assignment of a specific department account to specific users.

Variations and modifications of the present invention are possible, given the above description. However, all variations and modifications which are obvious to those skilled in the art to which the present invention pertains are considered to be within the scope of the protection granted by this Letters Patent.

For example, in the preferred embodiment the history tabs are used to view and modify mandatory franking information. However, the operation of the present invention need not be so limited.

What is claimed is:

1. In a franking machine, a control system comprising:
    a system controller; and
    a control interface for manually entering data and system directives, said control interface comprising:
    a touch screen; and
    a display generator adapted to generate displays on said touch screen, said display generator defining a plurality of touch button regions on said touch screen;
    wherein said control system is adapted to generate main displays and work displays, each of said displays also comprising main areas for entering current data and directives, and history tabs adapted to activate displays for viewing the status and previous action associated with a category of functions or information, and allowing a user to change information in the category associated with each specific history tab by using said touch button regions.

2. The control system in claim 1, wherein said history tabs activate displays for only one previous history of the category associated therewith.

3. The control system in claim 1, wherein said history tabs activate displays for categories of mandatory franking information.

4. The control system in claim 1, wherein said history tabs activate displays for categories of rate-related information.

5. The control system in claim 1, further comprising a display preference control coupled to said display generator, and adapted to control the grouping and orientation of said touch button regions.

6. The control interface in claim 5, wherein said display preference control and said display generator are adapted to locate groups with more frequently touched touch button regions in a user-chosen hemisphere of displays.

7. The control interface in claim 6, wherein said user-chosen hemisphere corresponds to the dominant side of the user's body.

8. The control system in claim 1, wherein said control system is further adapted to assign a particular advertisement field to be included in indicia printed on mail or mail labels, the particular advertisement field depending on the account to which mail being franked is charged.

9. The control system in claim 1, wherein said control system is further adapted to assign a particular advertisement field to be included in indicia printed on mail or mail labels, the particular advertisement field depending on the user operating said franking machine.

10. The control system in claim 1, wherein said control interface further comprises an overlay display activation key adapted to activate an series of overlay displays linked to said main displays or said work displays, said overlay displays adapted for entry of data or commands without closing the associated main or work displays.

11. The control system in claim 10, wherein said overlay displays are associated with display settings.

12. The control system in claim 10, wherein said overlay displays are associated with print engine management.

13. The control system in claim 10, wherein said overlay displays are associated with print position settings.

14. The control system in claim 10, wherein said overlay displays are associated with motor control settings.

15. The control system in claim 10, wherein said overlay displays are associated with user context-sensitive information.

16. A method of controlling the operation of a franking machine having a system controller and a control interface, said control interface including a touch screen, said method comprising the steps of:
    via said control interface, manually entering data and system directives;
    generating touch sensitive displays on said touch screen; and
    defining a plurality of touch button regions within said touch sensitive displays;
    wherein said displays comprise main displays and work displays, each of said displays also comprising main areas for entering current data and directives, and history tabs adapted to activate displays for viewing the status and previous action associated with a category of functions or information, and allowing a user to change information in the category associated with each specific history tab.

17. The method in claim 16, further comprising the step of, via said history tabs, activating displays for only one previous history of the category associated therewith.

18. The method in claim 16, further comprising the step of, via said history tabs, activating displays for categories of mandatory franking information.

19. The method in claim 16, further comprising the step of, via said history tabs, activating displays for categories of rate-related information.

20. The method in claim 16, further comprising the step of, via a display preference control coupled to said display generator, controlling the grouping and orientation of said touch button regions.

21. The method in claim 20, further comprising the step of locating groups with more frequently touched touch button regions in a user-chosen hemisphere of displays.

22. The method in claim 21, wherein said user-chosen hemisphere corresponds to the dominant side of the user's body.

23. The method in claim 16, further comprising the step of assigning a particular advertisement field to be included in indicia printed on mail or mail labels, the particular advertisement field depending on the account to which mail being franked is charged.

24. The method in claim 16, further comprising the step of assigning a particular advertisement field to be included in indicia printed on mail or mail labels, the particular advertisement field depending on the user operating said franking machine.

25. The method in claim 16, further comprising the step of, via said control interface, activating via an overly display activation key, a series of overlay displays linked to said main displays or said work displays, said overlay displays for entry of data or commands without closing the associated main or work displays.

26. The method in claim 25, wherein said overlay displays are associated with display settings.

27. The method in claim 25, wherein said overlay displays are associated with print engine management.

28. The method in claim 25, wherein said overlay displays are associated with print position settings.

29. The method in claim 25, wherein said overlay displays are associated with motor control settings.

30. The method in claim 25, wherein said overlay displays are associated with user context sensitive information.

* * * * *